(12) United States Patent
Jacobs

(10) Patent No.: US 8,200,760 B2
(45) Date of Patent: Jun. 12, 2012

(54) STORAGE AND AUTHENTICATION OF DATA TRANSACTIONS

(75) Inventor: Michael Jacobs, Abercarn (GB)

(73) Assignee: The Ascent Group Limited, Monmouth (GB)

( * ) Notice: Subject to any disclaimer, the term of this patent is extended or adjusted under 35 U.S.C. 154(b) by 989 days.

(21) Appl. No.: 10/519,827

(22) PCT Filed: Jun. 19, 2003

(86) PCT No.: PCT/GB03/02623
§ 371 (c)(1),
(2), (4) Date: Dec. 21, 2005

(87) PCT Pub. No.: WO2004/006073
PCT Pub. Date: Jan. 15, 2004

(65) Prior Publication Data
US 2006/0143462 A1    Jun. 29, 2006

(30) Foreign Application Priority Data
Jul. 2, 2002    (GB) .................................. 0215334.4

(51) Int. Cl.
*G06F 15/16*    (2006.01)

(52) U.S. Cl. ............ 709/206; 705/53; 705/71; 713/177; 713/178; 713/181; 709/207; 709/203; 709/217; 709/219; 380/20; 380/30; 380/282; 726/1; 726/2; 726/3; 726/4; 726/5; 726/6

(58) Field of Classification Search ........................ 726/3
See application file for complete search history.

(56) References Cited

U.S. PATENT DOCUMENTS
5,643,086 A    7/1997    Alcorn et al.
(Continued)

FOREIGN PATENT DOCUMENTS
EP    0281225    9/1988
(Continued)

OTHER PUBLICATIONS

Schneier, Bruce: "One-Way Hash Functions"; Dr. Dobb's Journal, vol. 16, No. 9, pp. 148-151; Sep. 1, 1991.
(Continued)

*Primary Examiner* — Nathan Flynn
*Assistant Examiner* — Bryan Wright
(74) *Attorney, Agent, or Firm* — Gordon & Jacobson, PC

(57) ABSTRACT

The various aspects of the present invention are based on four main principles: the provision, protection and validation of audit trails relating to data generated by and communicated between nodes of a network; authentication of communicating parties; enforcement of proof of receipt of data communications; and the detection of compromised user identifiers. The object of these principles being that, should a dispute arise over the substance of an authenticated e-mail or other data item, it would be possible to prove, with mathematical precision, the following features of the communication: the content of the message sent; the e-mail location to which the message was addressed; the fact that the message was despatched; the time and date of despatch; the fact that the message was received; the time and date it was received; and the fact that the content of the message had not been changed since it was sent. It is also intended to make it possible to prove the identity of the sender and the identity of the recipient.

6 Claims, 9 Drawing Sheets

U.S. PATENT DOCUMENTS

| | | | |
|---|---|---|---|
| 5,781,629 A * | 7/1998 | Haber et al. | 713/177 |
| 6,118,874 A * | 9/2000 | Okamoto et al. | 380/282 |
| 6,144,739 A | 11/2000 | Witt et al. | |
| 6,584,564 B2 * | 6/2003 | Olkin et al. | 713/152 |
| 6,928,442 B2 * | 8/2005 | Farber et al. | 707/10 |
| 7,113,594 B2 * | 9/2006 | Boneh et al. | 380/28 |
| 2001/0032088 A1 | 10/2001 | Utsumi et al. | |
| 2002/0004902 A1 * | 1/2002 | Toh et al. | 713/170 |
| 2002/0104026 A1 * | 8/2002 | Barra et al. | 713/202 |

FOREIGN PATENT DOCUMENTS

| | | |
|---|---|---|
| EP | 0 926 611 | 6/1999 |
| EP | 0926611 | 6/1999 |
| EP | 1 056 010 | 11/2000 |
| EP | 1056010 | 11/2000 |
| WO | WO 91/19614 | 12/1991 |
| WO | WO 95/09947 | 4/1995 |
| WO | WO 00/02394 | 4/2000 |
| WO | 01/50230 | 7/2001 |
| WO | WO 01/50230 | 7/2001 |
| WO | 02/48843 | 6/2002 |

OTHER PUBLICATIONS

Schneier, Bruce: "Digital Signatures"; Byte, vol. 18, No. 12, pp. 309-312; Nov. 1, 1993.

Weatherford, Margaret: "Mining for Fraud"; IEEE Intelligent Systems, Jul.-Aug. 2002.

Weatherford, "Mining for Fraud" Intelligent Systems, IEEE, Published Jul./Aug. 2002, vol. 17, Issue 4 (pp. 4-6).

* cited by examiner

STORAGE AND AUTHENTICATION OF DATA TRANSACTIONS

This invention relates to secure storage and positive authentication of data communications and transactions, particularly those taking place between parties across an information technology communications network, such as the Internet.

There are many circumstances in which it may be required to generate and store securely an audit trail of data transactions taking place over a period of time within, for example, an organisation and/or between such an organisation and other parties. Such an audit trail is only really useful if its accuracy can be verified/authenticated at a later date and, although some prior art arrangements exist which attempt to achieve this, they are not able to provide sufficient verification/authentication for some purposes. With such prior art arrangements, there is always an element of doubt because undetected compromise of stored data is still possible.

Further, as remote communications and transactions between parties across an information technology communications network increase, there is an increasing need to provide some form of proof of receipt by the intended recipient of such communications. Prior art protocols exist which enable the sender of a communication, such as an e-mail message, to determine that the communication has been delivered to a specified address and even that the message has been accessed or "read". However, such determination does not prove that the communication has necessarily been received by the correct recipient, nor does it provide any safeguard to enable any compromise of the communication or the intended communication path to be detected.

Still further, it is highly desirable, and in some circumstances essential, for a party to reliably authenticate a party with whom they wish to communicate and also to detect, substantially immediately, the compromise of a user identifier and to prevent any further transactions using that user identifier. Current arrangements rely on the valid user of an identifier to determine that the identifier has been compromised and inform a relevant monitoring body accordingly, so that the identifier can be cancelled and further transactions using that identifier prevented, which can sometimes not occur until many weeks after the compromise has taken place, during which time many unauthorised transactions using the compromised identifier may have been performed.

We have now devised arrangements which deal with these issues and seek to overcome the problems outlined above.

In accordance with a first aspect of the present invention, there is provided apparatus for storage of data, comprising means for storing copies of a plurality of data items, means for generating at the end of a predetermined period of time, a data file comprising hash values of each data item created and/or stored during that time, means for generating a single hash value of said data file, and means for transmitting said single hash value to a remote location for storage and/or publication thereof (or of data representative thereof).

In one embodiment of the first aspect of the present invention, a hash value is created locally for each file within a "snapshot". A table of these hashes is, itself, recorded in one of the organisation's snapshots, probably on a server, in a folder reserved for all hash tables. A table ("Master Document Table"—MDT) is created for each audit period which consists of the hashes of all the hash tables in that folder. Finally, the hash of the table, known hereinafter as a Master Document Hash (MDH), is sent to a remote third party. The data preferably comprises digital documents stored electronically, whether generated electronically or captured, for example by means of scanning a hard copy. The digital documents may, for example, comprise emails or the like transmitted between parties across an information technology network.

The first aspect of the present invention further extends to a method of storing and authenticating data, comprising the steps of storing copies of a plurality of data items, generating at the end of a predetermined period of time, a data file comprising hash values of each data item created and/or stored during that time, generating a single hash value of said data file, and transmitting said single hash value to a remote location for storage and/or publication thereof (or of data representative thereof).

The method of the first aspect of the present invention may include the steps of retrieving the stored copy of the data item, calculating the hash value (hashing) of the data item, comparing the hash obtained with its entry in the snapshot hash table; comparing the hash of that table with its entry in the Master Document Table for the period; checking that the hash of the MDT exists in the third party database; locating the third Party Master Document Hash (MDH) for the relevant table and, finally, assuming all hashes in the chain match to this point, obtaining the name of the relevant journals and publication dates from the third party, in order to check a copy of the relevant published journal and confirm that the relevant MDH matches the published version.

In accordance with a second aspect of the present invention, there is provided apparatus for transmitting data between first and second end users via an information technology communications network, said first end user comprising means for encrypting a data item using a first identifier and transmitting said encrypted data item to said second end user, said second end user comprising means for receiving said encrypted data item and transmitting an acknowledgement signal to said first end user, said first end user further comprising means for encrypting said first identifier using a second identifier and transmitting said encrypted first identifier to said second end user in response to receipt of said acknowledgement signal, said second end user further comprising means for requesting and receiving said second identifier in response to receipt of said encrypted first identifier, and means for decrypting said first identifier using said second identifier and for decrypting said data item using said first identifier.

Also in accordance with the second aspect of the present invention, there is provided a method for transmitting data between first and second end users via an information technology communications network, comprising the steps of encrypting by the first end user a data item using a first identifier and transmitting said encrypted data item to said second end user, receiving by said second end user said encrypted data item and transmitting an acknowledgement signal to said first end user, said first end user encrypting said first identifier using a second identifier and transmitting said encrypted first identifier to said second end user in response to receipt of said acknowledgement signal, said second end user requesting and receiving said second identifier in response to receipt of said encrypted first identifier, decrypting said first identifier using said second identifier and decrypting said data item using said first identifier.

In a preferred embodiment, the second identifier is stored remotely from said first and second end users, preferably by a third party. Beneficially, said second identifier is transmitted to said remote storage location together with a hash value of said encrypted first identifier, by said first end user. Beneficially, the transaction embodied by transmission of the second identifier to the remote storage location is time stamped.

In a preferred embodiment, the second end user transmits a request for the second identifier to said remote storage location, the request being in the form of a hash value of the encrypted first identifier.

In a preferred embodiment of the invention, the data item is encrypted using a symmetric key and the first identifier or key is encrypted using an asymmetric key. The acknowledgement signal may comprise a hash value of the original data item.

Thus, in accordance with the second aspect of the invention, the identifier first or "Secret Key" is sent separately and only when a request for it is received which takes the form of the hash of the encrypted data item Message—thus proving the recipient has received the correct file.

The secret key is then encrypted with a further secret key and further encrypted with the recipient public key and sent to the second user.

A copy of the second secret key is sent to the third party, together with a hash value of the second message (the encrypted secret key) which was sent to the recipient. The recipient must now request the second Key from the third party by submitting the hash of the second message. The third party logs all its transactions and protects it own audit trail, so we now know that the recipient has received the message, its secret key, and, unless it reports a fault immediately, that it also has the second key.

The software which controls the request for the second key is beneficially arranged to ensure that it continues requesting until it is received and will not permit further transactions until it is received. Nor can it decrypt the second Key until it has formally acknowledged the receipt of the key. The protocol also requires human agreement that any communication failures not corrected by the system must be reported immediately to the sender by the quickest communication channel available. In other words, failure to report a problem in receipt constitutes acceptance of the successful transmission and decryption of the message and any liabilities which flow from that.

In accordance with a third aspect of the present invention, there is provided apparatus for verifying by a second end user the authenticity of use of an identifier by a first end user, the apparatus comprising means for identifying the communication of a data item encrypted using or otherwise including an identifier unique to said first end user from said first end user to said second end user across an information technology communications network, means for accessing, in response to such identification, storage means containing information relating to one or more valid recent events or transactions relating to said identifier which have occurred across said information technology communications network, means for obtaining confirmation from said first end user that at least one of said recent events or transactions is valid, and means for preventing further use of said identifier in the event that such confirmation is not received.

Also in accordance with the third aspect of the present invention, there is provided a method for verifying by a second end user the authenticity of use of an identifier by a first end user, the method comprising the steps of identifying the communication of a data item encrypted using or otherwise including an identifier unique to said first end user from said first end user to said second end user across an information technology communications network, accessing, in response to such identification, storage means containing information relating to one or more valid recent events or transactions relating to said identifier which have occurred across said information technology communications network, obtaining confirmation from said first end user that at least one of said recent events or transactions is valid, thereby preventing further use of said identifier in the event that such confirmation is not received.

Thus, "Strong Revocation" in accordance with a third aspect of the invention, is intended to speed up the discovery of compromised keys. It achieves this by logging key transactions through a third party. The third party answers each new call by insisting that each user of a registered key is forced to acknowledge the validity of the immediately preceding transaction with the third party. Only if the previous transaction is confirmed does the new transaction proceed.

This is achieved by keeping some token of the previous transaction which can serve as a reminder to the calling system. Specifically, in this context, the last hash sent by the caller is preferably kept. The third party returns the previous hash, the caller's software flashes up the last transmission to the third party and compares the incoming hash with the hash of that transmission. If it matches, it advises the user accordingly. It is then for the user to acknowledge that s/he also recognises that transaction as being the last valid communication to the third party. If either the software or the user do not confirm the validity of the transaction, the new transaction is blocked and the caller's public key revoked (at least within the domain of the third party—they may not have authority to revoke it globally).

Embodiments of the various aspects of the present invention will now be described by way of examples only, and with reference to the accompanying drawings, in which.

The following specific description refers specifically to the generation, sending, receipt and storage of e-mails or similar data communications across an information technology communications network. However, it will be appreciated by a person skilled in the art that at least some of the methods and protocols described herein can equally be applied to the handling of other types of data items. In general, the various aspects of the present invention are intended to enable the provision, for any given e-mail document or other data item, of an audit trail with further provision for substantial authentication and verification thereof.

Thus, the various aspects of the present invention are based on four main principles:

the provision, protection and validation of audit trails relating to data generated by and communicated between nodes of a network;

authentication of communicating parties;

enforcement of proof of receipt of data communications; and the detection of compromised user identifiers.

The object of these principles being that, should a dispute arise over the substance of an authenticated e-mail or other data item, it would be possible to prove, with mathematical precision, the following features of the communication:

the content of the message sent;

the e-mail location to which the message was addressed;

the fact that the message was despatched;

the time and date of despatch;

the fact that the message was received;

the time and date it was received; and the fact that the content of the message had not been changed since it was sent.

It is also intended to make it possible to prove the identity of the sender and the identity of the recipient.

Thus, in order to satisfy, for example, various legal requirements and/or challenges, it may be necessary to ensure that every relevant step in an e-mail communication is forensically provable. Each protected e-mail would require its own verifiable audit trail and it must be verifiably impossible to amend that audit trail without detection. As such, the following information (at least) needs to be captured within such an audit trail:
the identity of the sender;
the content of the message sent;
the address to which the message was sent;
the date and time the message was sent;
the date and time the message was received;
the content of the received message; and
the identity of the recipient.

Figure 1:
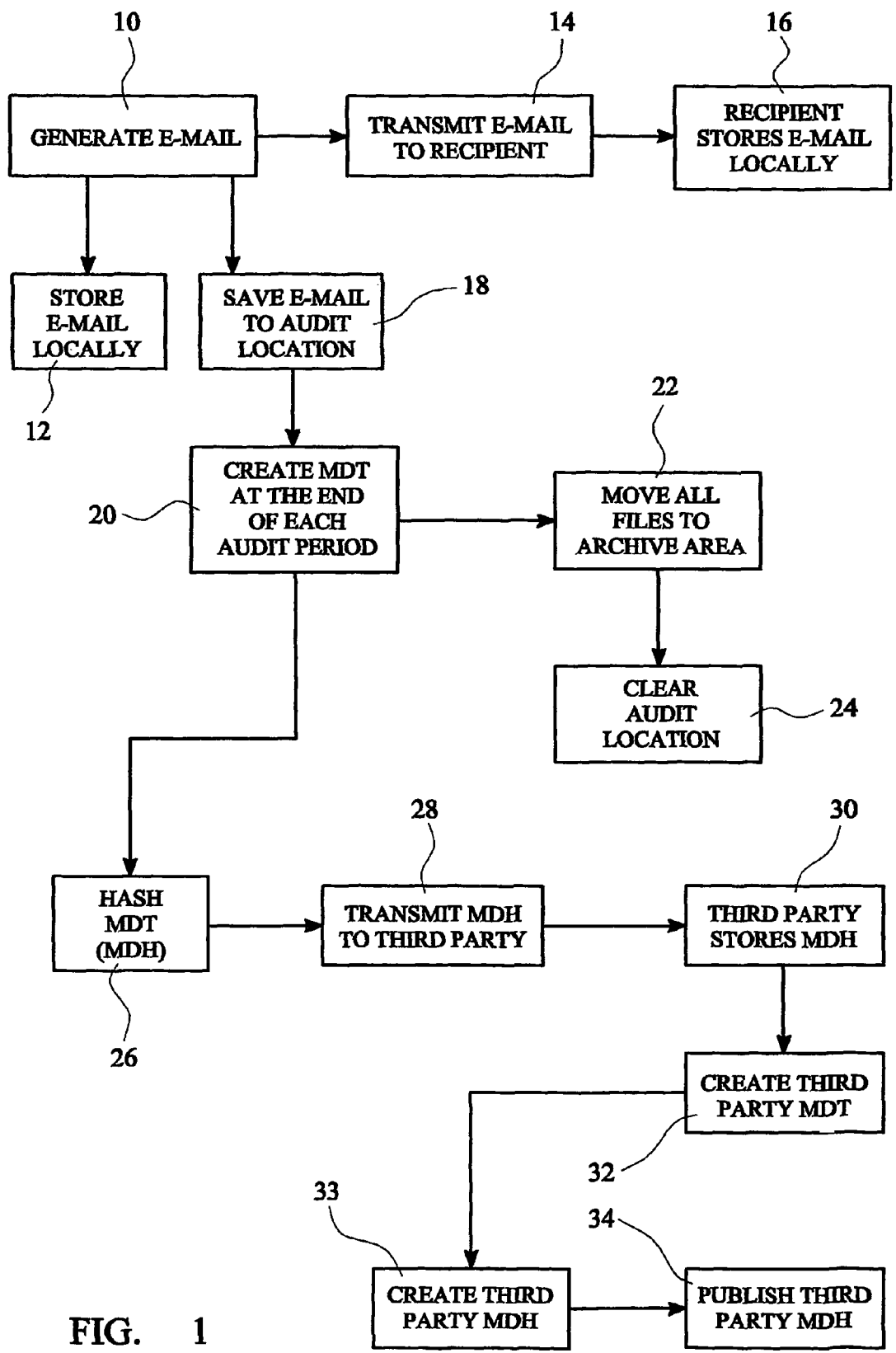
FIG. 1 is a flow diagram of a method according to a first exemplary embodiment of the present invention.

Referring to FIG. 1 of the drawings, a flow diagram of an exemplary embodiment of a method according to the first aspect of the present invention is illustrated.

At step 10, an e-mail message is generated and stored (at step 12) by the author/sender of the message. The e-mail message is then transmitted, at step 14, to the recipient across an information technology communications network, and the message may also be stored locally (at step 16) by the recipient.

It is well known to archive data files stored locally so as to provide a back-up to protect against disaster or theft. The most commonly used way of achieving such archiving is known as incremental archiving which begins with a complete backup of everything required to protect against disaster or theft, and thereafter involves creating a back up which only captures changes which have taken place since the previous backup. However, although this method of backup is routinely used by commercial organisations throughout the world, this type of backup does not provide a suitable audit trail for verifying the authenticity of documents, because it loses track of the date and time at which the data was created. One way of overcoming this problem is to take periodic "snapshots" of the data, which snapshots are, like the original backup, a complete copy of all of the protected data. This method enables the capture of new material at the point of its creation, but is hugely wasteful of time and storage space.

Thus, the data files in which the newly-generated e-mails are stored locally may either be regularly and sequentially archived or, more preferably, in accordance with this exemplary embodiment of the present invention, a new procedure is proposed for the creation of any files required to be subject of audit. The proposed method involves saving (at step 12) the content of the data item within the application in which it is created, and simultaneously saving the data item to an audit location (at step 18). It will be apparent that within any organisation, there will be a number of users all creating and changing documents and, as such, it is necessary for each data item saved to the audit location to include some form of identifier representative of the source of the new data.

At the end of each audit period, a new table is created (at step 20) which contains the following data:
hash values of all files contained in the audit location,
their filenames and/or
absolute pathnames,
their filesize and
time stamps This table is known as a "Master Document Table" (MDT). The MDT and all files in the audit location are permanently moved (at step 22) to an archive area and the audit location is cleared (at step 24) for the files in the next audit period.

The hash of the MDT is created (at step 26) and is known as the "Master Document Hash" (MDH). It is this hash which is sent (at step 28) to the third party.

There are three important features of the "one way hash" which provide substantial benefits to the present invention:
Unlike other encryption techniques, it is not possible to reverse a hash to discover the original data This makes it much easier to protect the data.
The algorithms which may be used to create the hashes are freely available and usable from within standard web browsers and the like. This makes it much easier to enable remote users to authenticate data.
Although it is mathematically conceivable that two different sources could produce an identical hash, the odds against this are $2^{160}$, which enables a considerable amount of confidence that, for the purposes of the present invention, the hash value of any document is unique.

Periodically, again typically daily, the third party will receive many data of this and related types. In a preferred embodiment of this invention, the third party will copy (at sep 30) all such data received to CD ROMs (of the type which can only be written to once) before making such data available for public access. A new table will be created (at step 32) for each of these CD ROMs which stores the following information about each file on the CD.
File Hash
Filename
File source
File time-stamp
File size
CD ROM identifier
(optionally) authorised user who uploaded data This table is the third party's MDT. Its MDH (created by hashing the MDT at step 33) will be published (at step 34) in reputable journals.

To maximise integrity, the CD ROM will be "closed" (which prevents further writing to it) even if it is not full; its MDT completed (and saved to another CD) and its MDH calculated and published at the end of each audit period—typically daily. If demand is sufficiently high to warrant multiple CDs within the audit period, each cd will have its own MDT and all relevant MDHs will be published. If demand regularly requires more than three CDs, the third party may switch to using DVD ROMs which are a similar technology but hold approximately four times as much data on a single disk. However, as DVD recording does not (to date) support multiple sessions, there may be security risks involved in holding uploaded data for several hours before DVD recording. It may also be undesirable to delay public access for as long as DVD recording may imply.

Figure 2A:
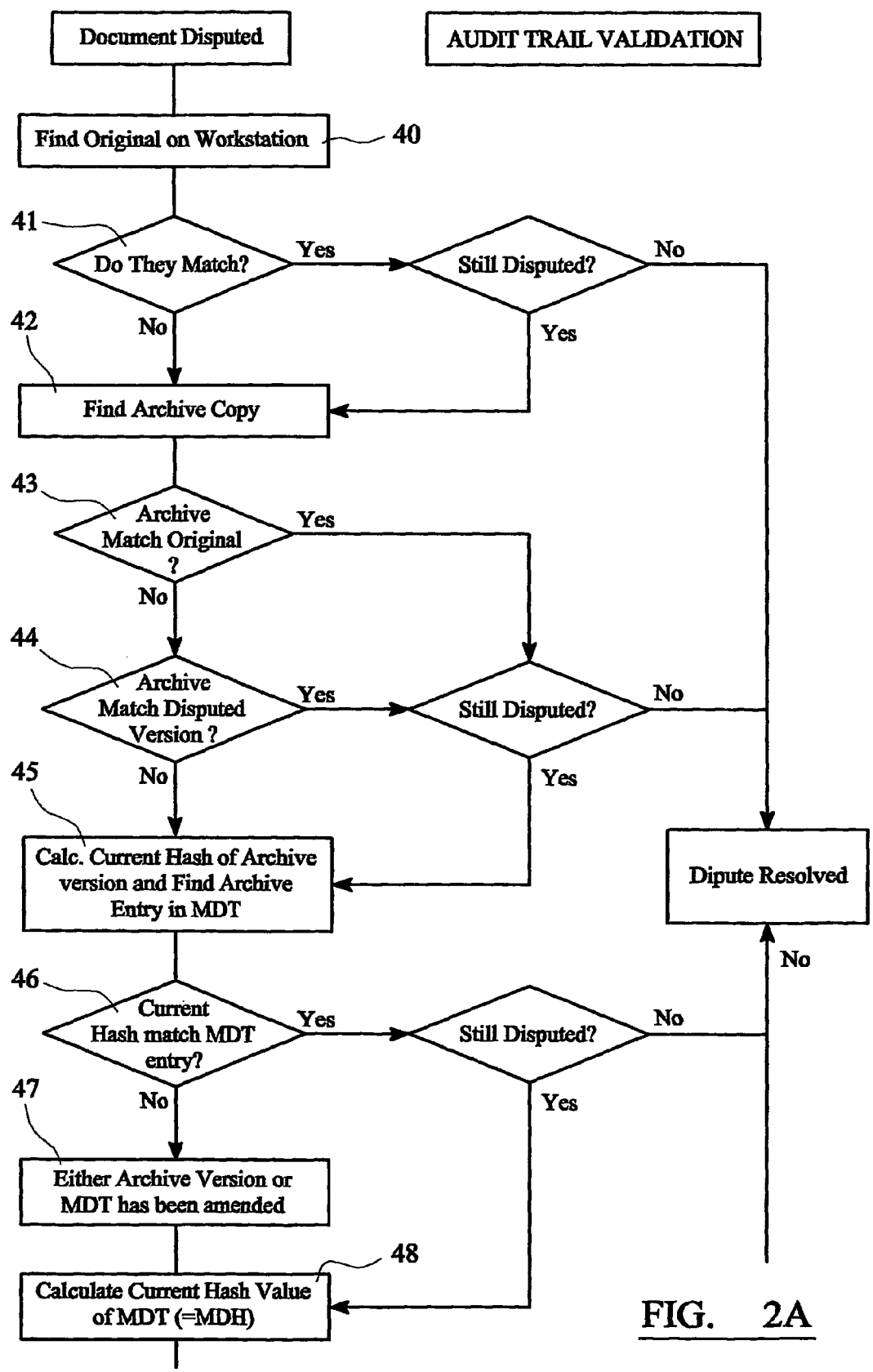
FIG. 2 is a flow diagram of a method according to a second exemplary embodiment of the present invention.
Figure 2B:
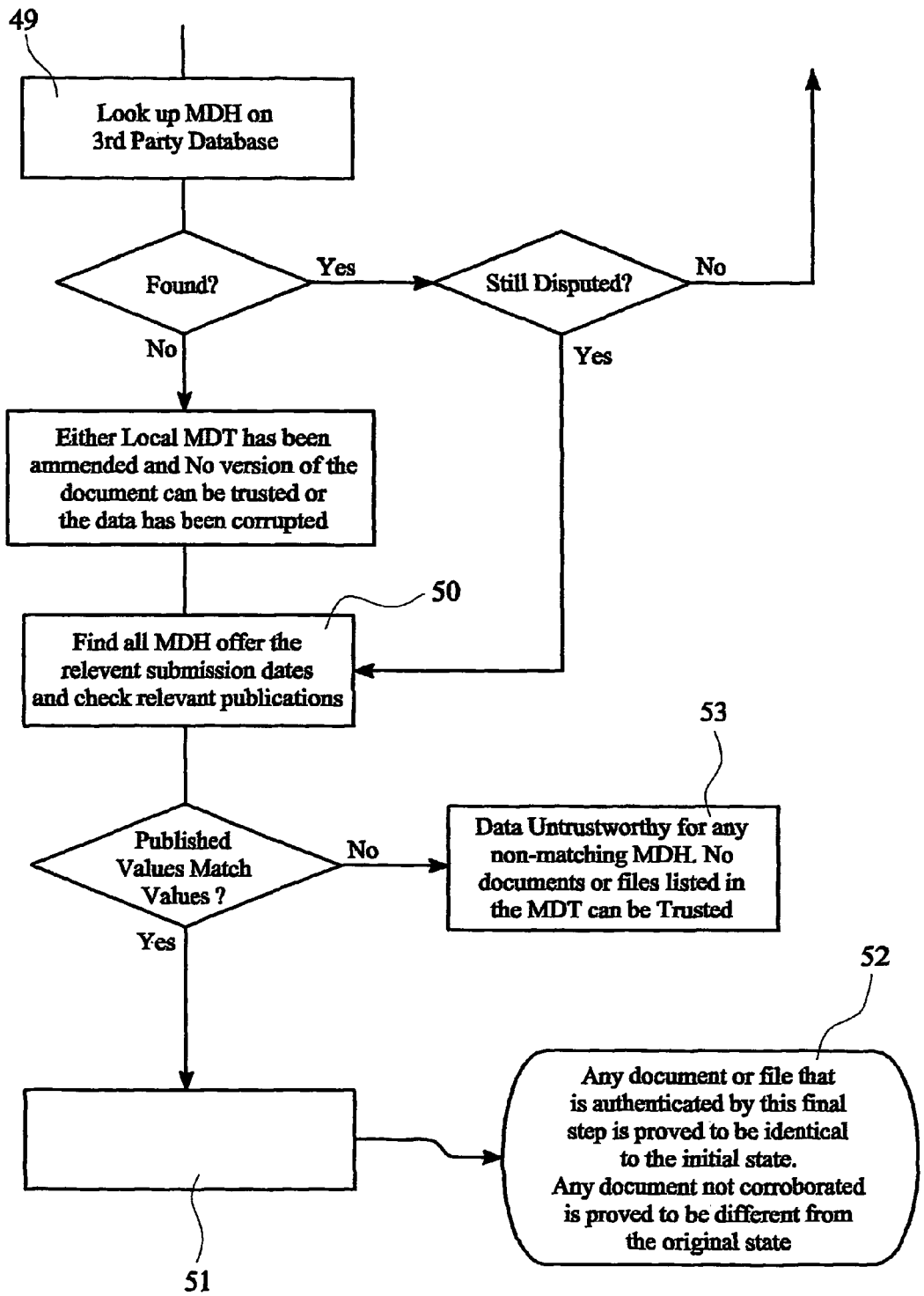

Thus, in accordance with the above-described protocol, in the event of a dispute, the audit trail created using the method described above can be used to confirm (or repudiate) any given e-mail as follows, and as illustrated by the flow diagram of FIG. 2:

The disputed document (which may comprise any digital document whether transmitted or otherwise) will be traced (40). Initially it will normally be found in the application dat space on the originating workstation. It will be compared with the disputed version (41). If there is no difference, then there is no dispute (as to content at least) and the matter rests (as far as audit trails are concerned).

However, if there is a difference, then the requirement is for the originator to prove that their version is as it was when first created and distributed. This process begins with a search in the organisations archive area for the relevant document (42). If found, it is compared with both the originator's version (43)

and the disputed version (44). If it matches the disputed version, that suggests that the originator has amended the document since its initial distribution. If it matches the originator's version, that suggests the disputant has amended their copy. In either case, we now need to prove the validity of the archive copy.

First we find its entry in the relevant MDT. We calculate its current hash value (45) and compare that to the hash value stored in the MDT (46). If they do not match, this suggests someone has amended either the MDT or the archived document (47). If they do match, then either the archived document and MDT have remained unchanged as they should, or both have been changed to ensure a match. In either case, we can only be sure of the original state of the MDT by calculating its hash (48). Even if we find it there, it suggests no change has taken place, it is still possible that a sophisticated attacker could have infiltrated both the local organisation and amended the documents on its audit trail and the third party and created a suitably amended CD ROM. The only way we can prove this can not have taken place is to check that the MDH of the third party CD ROM still matches the published version (50). If it does, and the relevant journals are sufficiently numerous (typically millions of daily newspapers) then it is the contention of this invention that it is impossible for an attacker to have altered the published hash values to agree with the third party record, i.e. the content of the document is proved and the audit trail is proved to be trustworthy (51). Any document or file that is authenticated by this final step is proved to be identical to the initial state. Any document not corroborated by this step is proved to be different to the initial state (52).

It is conceded that, if an attacker knows in advance, where an auditor is likely to perform their check of published journals, that it would be feasible for the attacker to alter the one or two copies of the journal necessary to fool the auditor. It is, therefore, important for the auditor to take steps to make their choice of check locations and journals as unpredictable as possible. Preferably, for example, the auditor would select more than a dozen widely separated public libraries at random in which to check thejournals. If the published MDH does not match the third party MDH, the third party data is shown to be untrustworthy for any non-matching MDH. No documents or files listed in the relevant MDT can be trusted (53).

The second aspect of the present invention is concerned with the unequivocal proof of despatch and receipt of an e-mail between parties communicating across an information technology communications network, and their respective identities. The method described above provides an audit trail which can be used, independently by the sender to provide proof of despatch or by the receiver to provide proof of receipt. On its own, however, it is not capable of linking the two potential audit trails together. Specifically, it cannot be used to prove to the sender that an e-mail has been received and it does not, on its own, prove to the recipient who has sent the e-mail. Neither does the audit trail, as described above, prove the identity of the participants.

Although encryption may not be required for other purposes (i.e. the message may not be confidential), it does provide a very useful means, in accordance with the second aspect of the present invention, for proving receipt of data via an information technology communications network. It is useful to first consider generally the concept of the public key infrastructure, which may be used to encrypt (and, of course, decrypt) messages and/or digitally sign documents.

Public key or asymmetric encryption employs an algorithm using two different, but mathematically related, "keys", one for encrypting data and one for decrypting that data. The complementary keys of a public key (or PK) infrastructure are termed the private key and the public key. Thus, an entity that needs to authenticate its identity electronically or sign or encrypt data can employ the public key infrastructure and would have a public key and a private key associated therewith. Each public key may be published, or is at least fairly widely known, whereas the private key is kept secret. Data encrypted with the public key can be decrypted only with the private key, and conversely data encrypted with the private key can only be decrypted with the public key. Although this is obviously not a good way to keep messages secret, it is a good way to prove you are the owner of the private key. Anyone can decrypt it using the public key and it is accepted that any messages decrypted with the public key can only have been created by someone in possession of the private key. Hence private key encryption can be used as a basis for digital signatures.

Figure 3:
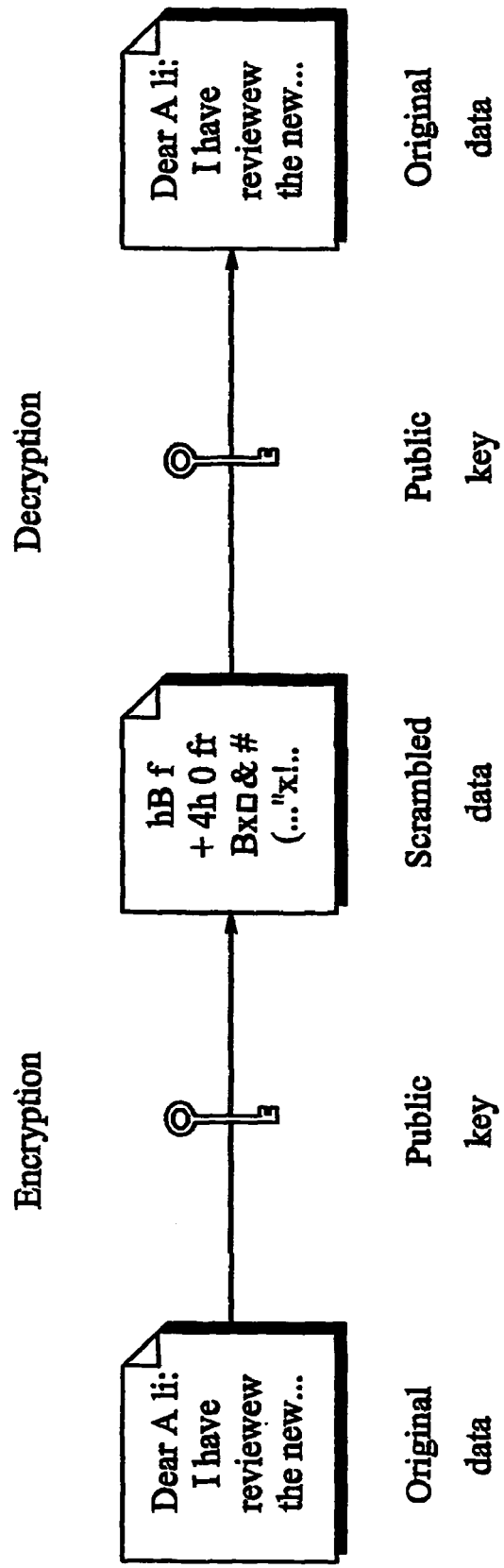
FIG. 3 is a schematic diagram illustrating the public key encryption method according to the prior art.

Thus, as shown in FIG. 3 of the drawings, a first user can encrypt data using the second user's public key and transmit that encrypted data across an information technology communications network to the second user, safe in the knowledge that the data can only be decrypted and read by the second user's private key (which should only be available to the second user). As such, the second user can freely distribute their public key, knowing that only they (the holder of the corresponding private key) will be able to decrypt any data encrypted using that public key.

Another form of encryption is known as symmetric key encryption, which requires substantially less computation overhead than asymmetric encryption, and is therefore much more appropriate for large amounts of data. In the case of symmetric encryption, both parties to a communication share a secret key, which is used by the sender to encrypt a message and then again by the recipient to decrypt the message upon receipt. It is considered, at least potentially, to be the safest form of encryption. One specific type of symmetric encryption, which can be proven mathematically to be completely secure, is known as the "One Time Pad" in which one character of Pad is used for each character of a message and then never used again. The One Time Pad is the ultimate symmetric key, but it also demonstrates s major weakness in connection with symmetric keys: the so-called "Key Distribution Problem", i.e. how can the secret key for use in symmetric encryption/decryption be distributed safely in the first place? Obviously, if a secure channel is available for distribution of the key, then that channel may as well be used for transmission of the message without the need for encryption. In practice, therefore, the One Time Pad can only be considered to be completely secure if parties physically meet to exchange secret keys.

The use of public key (or asymmetric) encryption, as described above, solves the key distribution problem, but its processing overhead is a major disadvantage. Firstly, it takes considerably longer to encrypt or decrypt a message encoded with a lengthy public key than it does to encrypt the same message with even the strongest (i.e One Time Pad) symmetric key. Furthermore, relatively short symmetric keys have the same strength as much longer asymmetric keys. Thus, for example, if it is required to encrypt a message such that it could not be decrypted by an unauthorised user (simply using code cracking techniques) for at least the next 5 years, a 2048-bit long public (and corresponding private key) would be required, whereas the same level of protection can be achieved using a 160-bit symmetric key. Nevertheless, the public key infrastructure is important because the private key can be used to sign data with your digital signature, which is an important requirement in the case of electronic commerce and other commercial applications of cryptography. The most useful and common form of a digital signature takes the form of a hash value of the message itself, encrypted using the sender's private key. The recipient-decrypts the signature using the sender's public key. If the result matches the hash value of the decrypted message, the recipient has proved both the source of the message (the sender) and that the message has not been altered since the signature was applied.

It is for these reasons that the most common means of using PK cryptography takes this form.

Create Message
Create Digital Signature
  Hash the Message
  Encrypt the Hash with sender's Private Key
Create or obtain secret key
Encrypt Message with secret key
Encrypt secret key with Recipient's Public Key
Send "Package" containing
  PK encrypted secret key
  Secret Key Encrypted Message
  Digital Signature of Hash of Message However, in accordance with the second aspect of the present invention, the Secret Key is not sent with the Message and Digital Signature. It is only sent in response to a digitally signed request from the recipient which takes the form of a hash of the encrypted Message. As only someone with that encrypted message could produce the matching hash, the request provides unequivocal evidence that the recipient has received the correct encrypted message. The digital signature confirms the source of the request as being the intended recipient.

Figure 4A:
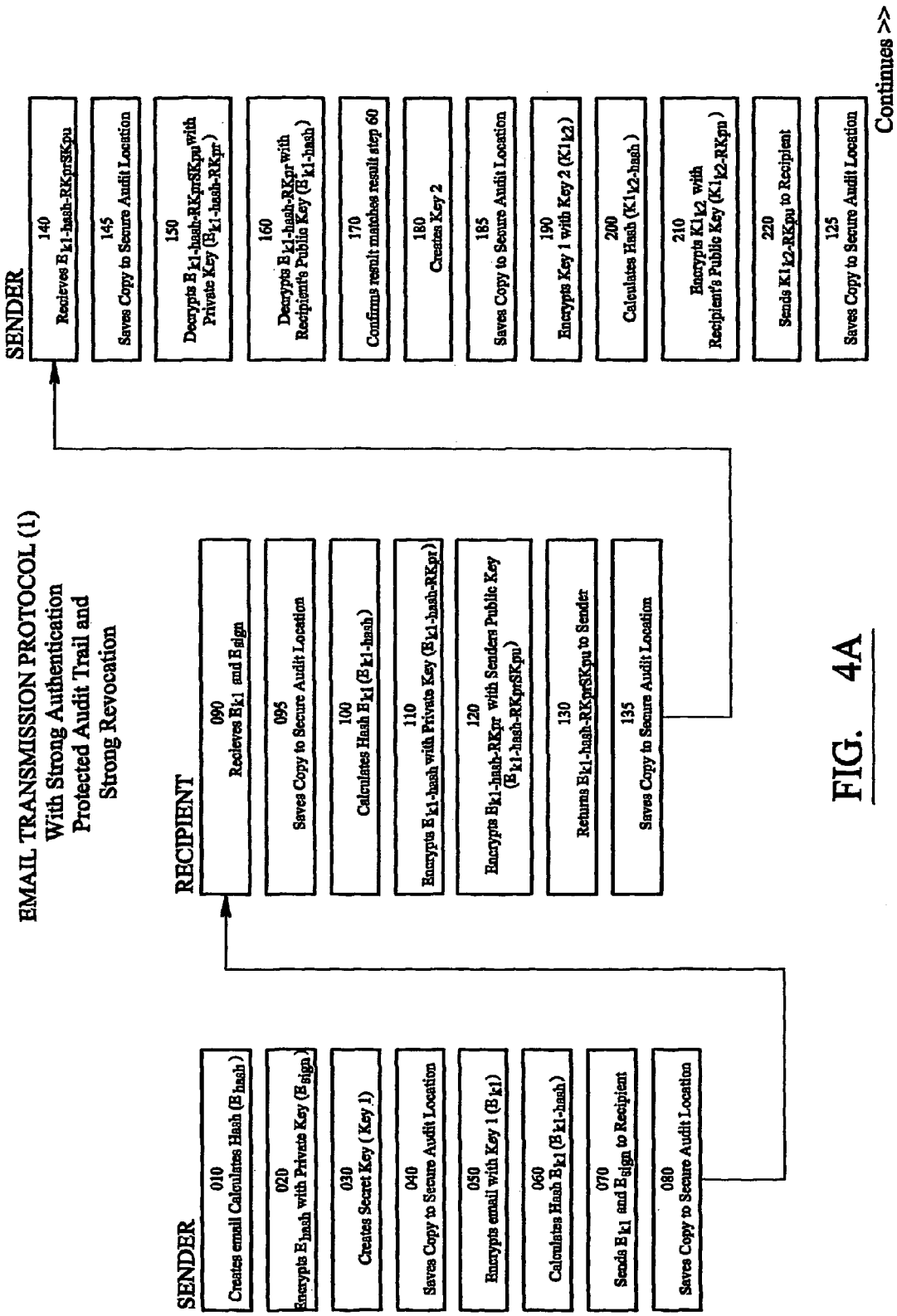
FIGS. 4A to 4E are a flow diagram of a method according to an exemplary embodiment of the present invention.
Figure 4B:
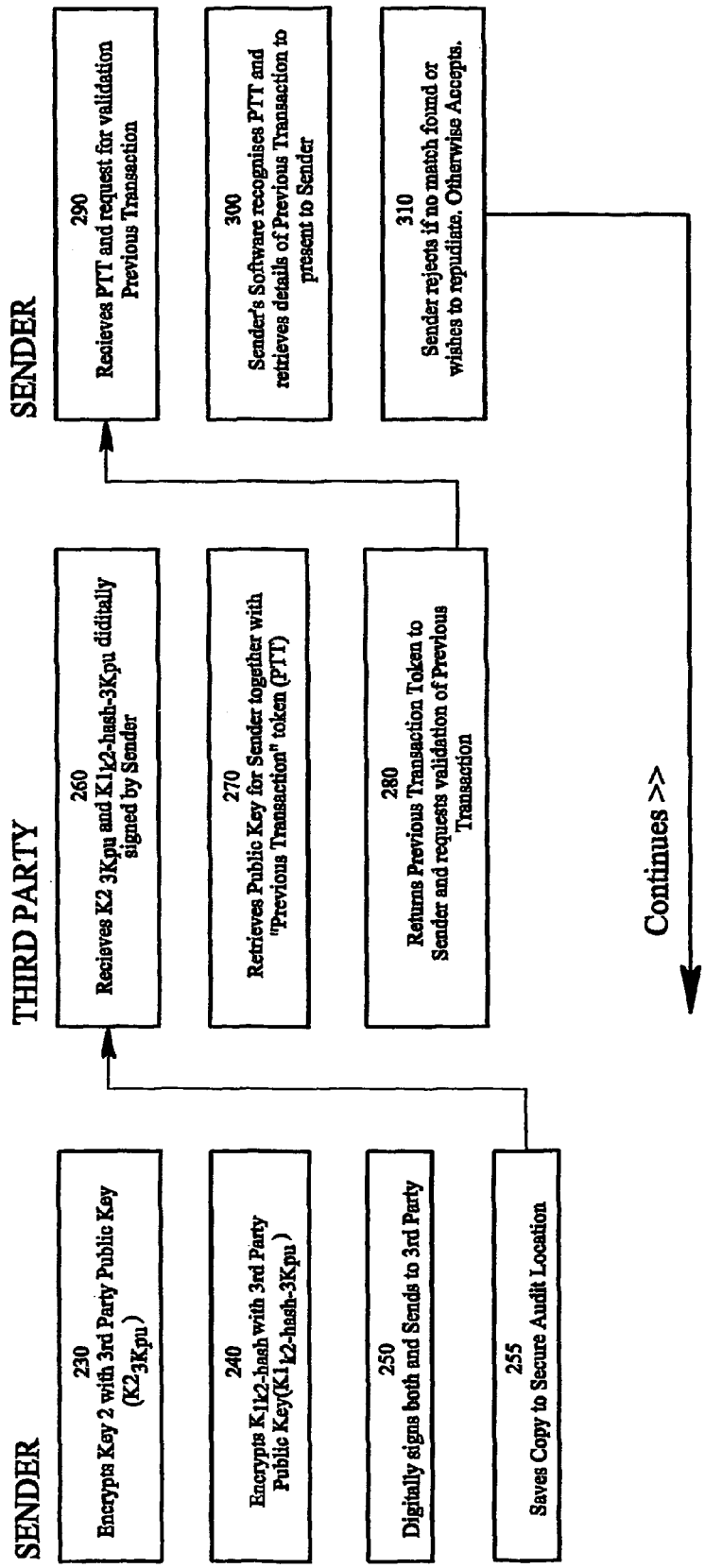
Figure 4C:
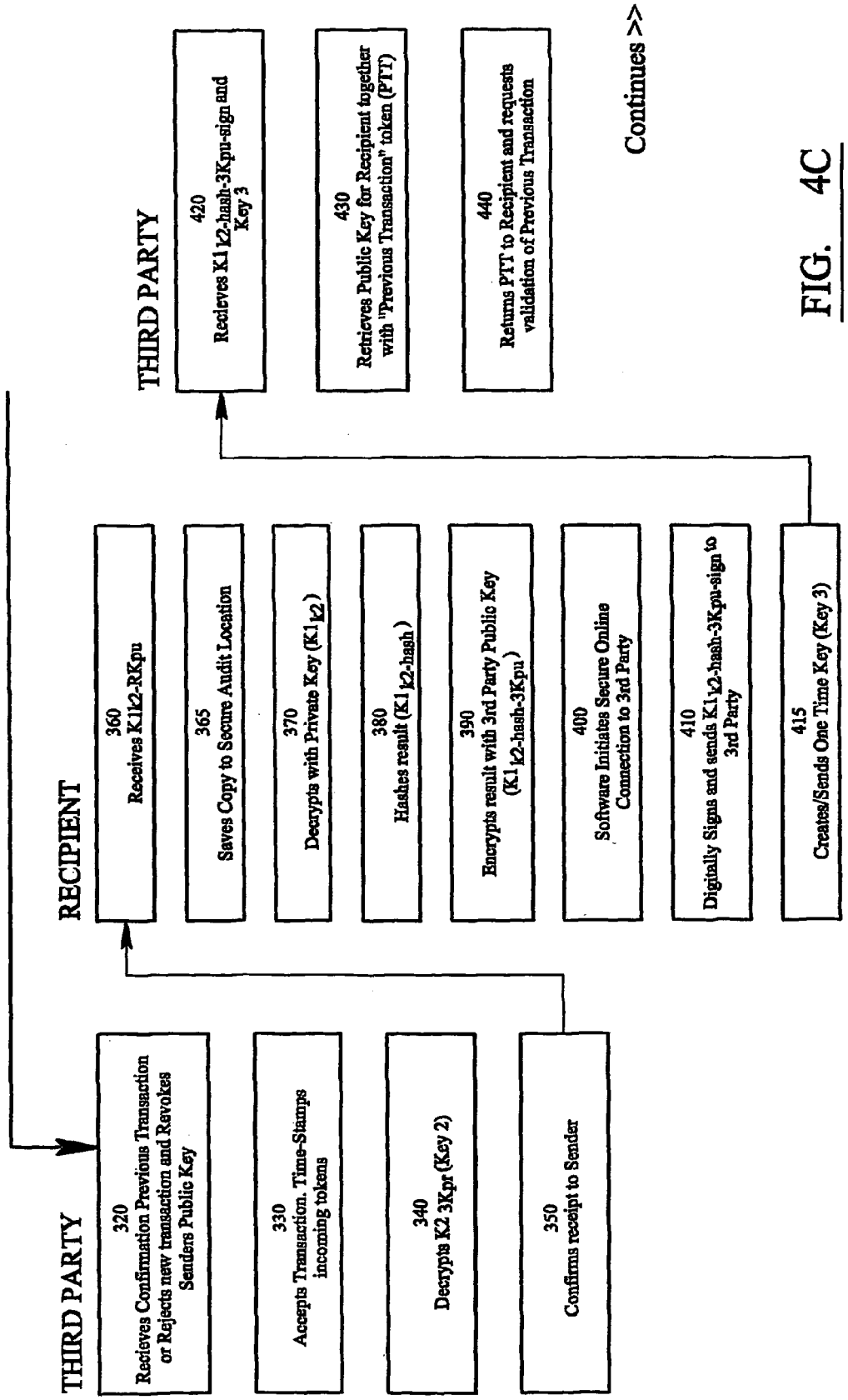
Figure 4D:
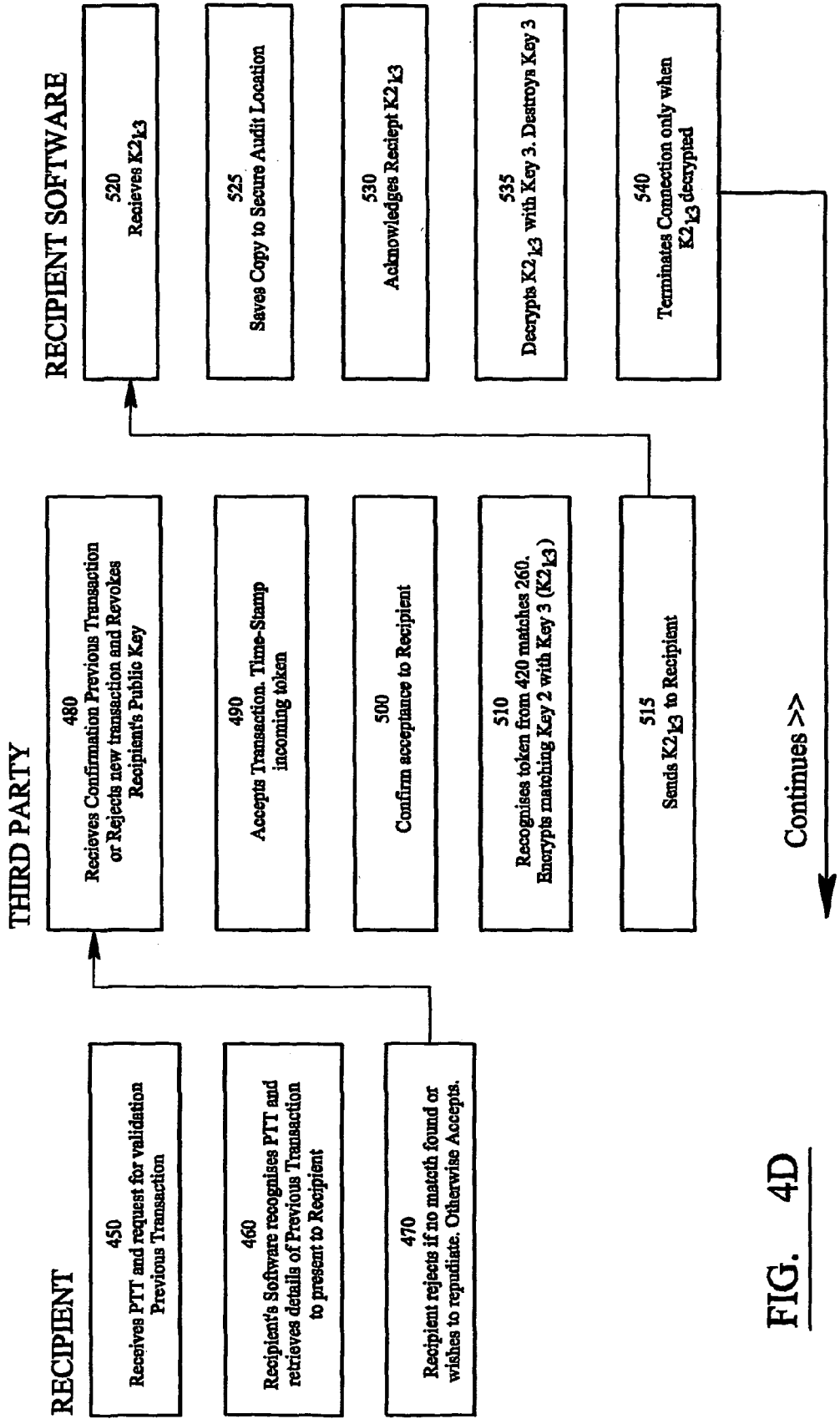
Figure 4E:
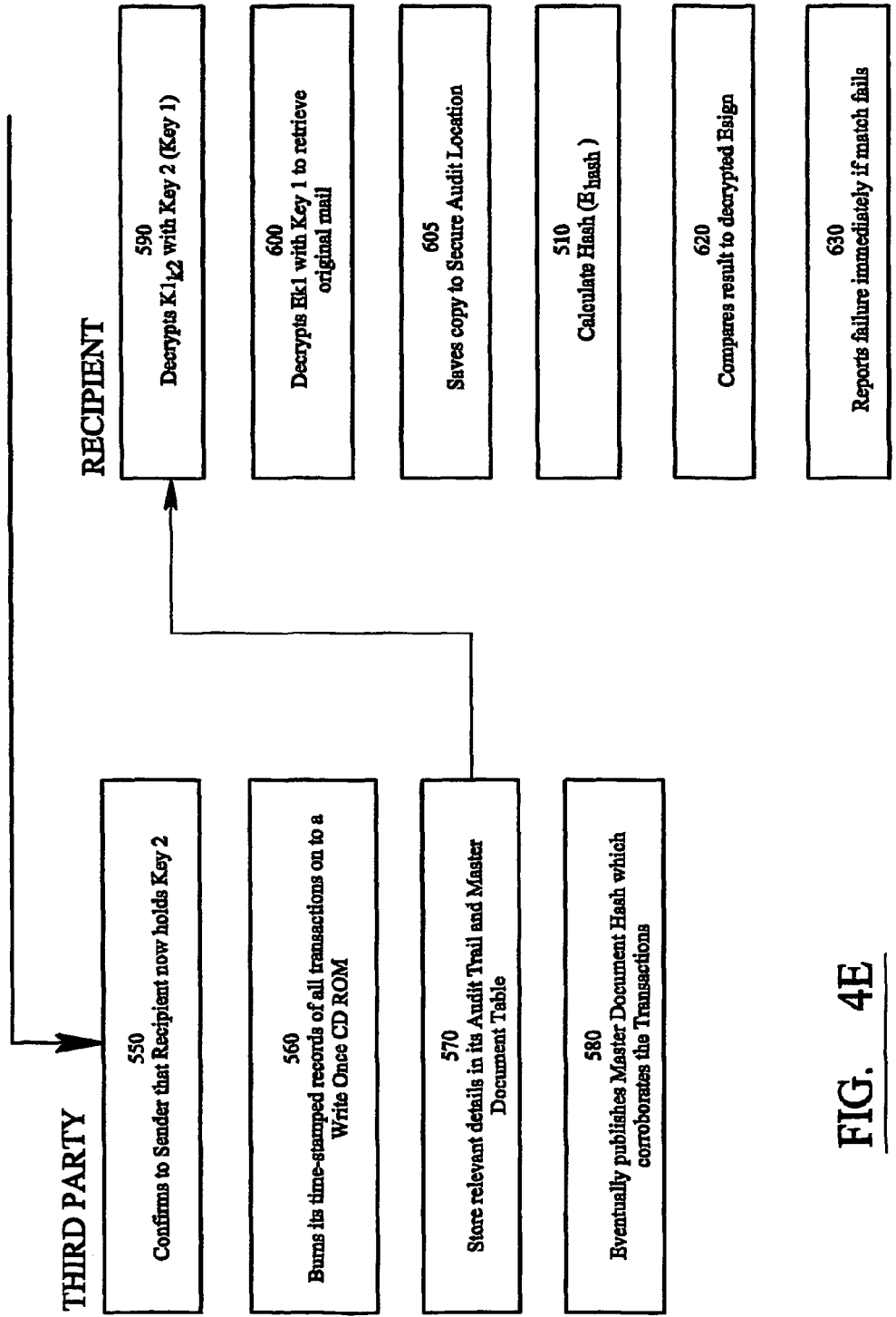

Thus, referring to FIGS. 4A to 4E of the drawings and particularly FIGS. 4A and 4B in the method according to an exemplary embodiment of the present invention, a sender creates an e-mail and stores its hash value at step 010. The sender then encrypts the hash of the message with their Private Key (digitally signs) (at step 020) and encrypts the actual message with a secret key (Key 1) (step 050) and transmits the encrypted message and signature but not the Key, to the recipient (at step 070). In order to obtain Key 1, the recipient must generate the hash value of the received encrypted message (step 100) and transmit this hash, digitally signed, back to the sender.

The sender now has unequivocal evidence that the recipient has received the encrypted message. In response to receiving the relevant hash, the sender encrypts Key 1 with another Key (Key 2). This is digitally signed and further encrypted with the Recipients Public Key before transmission to the recipient.

The purpose of Key 2 is to establish a transaction through the third party in such a way that neither the message nor the secret key need to go through that third party (thus eliminating issues of Trust) but that the message cannot be read without a vital corroborating transaction being logged by the third party.

When the sender creates Key 2, they digitally sign it and send it to the third party together with the hash of the encrypted Key 1 they have already sent to the recipient (steps 230-250). The third party time-stamps the incoming Key 2 and stores the transaction as part of its audit trail, protected as above. The recipient received the encrypted Key 1, decrypts it PK wrapper with their own private key, hashes the result, digitally signs it and sends that to the third party as a request for Key 2. The third party logs that transaction in the same way as above and returns the requested Key 2. The third party also informs the sender that Key 2 has been sent.

The next issue is proof of receipt of Key 2. This is dealt with as follows. First, Key 2 is relatively short (no more than 32 bytes-256 bits). Second, the procedure at the recipient end is automated by the software written for this purpose which
Recognises the incoming Key 1 message (from standardised content in the header) will not permit the Key to be downloaded unless the recipient gives the software permission to remain on line while it carries out the steps above
Removes the PK wrapper
Hashes result
Digitally signs it
Sends it to third party as request for Key 2
Creates and sends a one time pad for use by the third Party in returning Key 2
And will not attempt to decrypt the Key 2 package or conclude its end of the requesting transaction until a digitally signed (by third party) Key 2 has been received
And receipted by the software The software request for permission takes the form of a reminder of the significance of the incoming Key 1, the procedures about to be carried out, if the recipient agrees, and that the recipient is obliged to report any unanticipated failures to download either Key 1 or Key 2 to the sender with an (agreed) time frame of, say 1-24 hours. The recipient is reminded that their endorsement of the Previous Transaction with the third party is required before the new transaction can proceed and that their agreement will be signified by their digitally signed request for Key 2 which transaction will be logged by the third party. Finally, the recipient is required to indicate their agreement (or rejection) by entering a random 4 digit code generated by the software on each such occasion. This ensures that the recipient cannot agree without conscious understanding and participation.

In the absence of a failure report from the recipient, the system can now demonstrate, beyond reasonable doubt, that
An encrypted message and relevant keys have been sent by the sender or, more precisely, by someone who has access to the sender's private key
The same message and keys have been received by the recipient (or someone who has access to the recipient's private key)

The final aspect of the invention deals with the issue of precise identity of sender and recipient. This remains a more difficult problem that either proving the audit trail or the despatch and receipt of messages. Final proof of precise identity is not possible without auditable biometric data. This invention does not solve that problem. It does, however, claim to reduce the probability of identity theft to the extent that a court would be able to accept that the balance of probabilities is such that the identity of communicating parties would be established beyond reasonable doubt.

In order to provide some form of certainty to others that an authorised signatory does in fact correspond to the identity of a particular person, one or more trusted third parties are used to associate an identified signer with a specific public key. Such a trusted third party is often termed a "certification authority". To associate a key pair with a prospective signer, a certification authority (such as a bank, post office, commercial body, etc.) issues a certificate which is an electronic record listing a public key as the "subject" of the certificate and confirming that the prospective signer identified in the certificate holds the private key.

However, this process relies on the fact that the digital certificate and the associated key pair have not been compromised. For example, the digital certificate may have been validly issued to an authorised signatory initially, but the private key may since then have been compromised in some way. There is no provision for up-to-date verification in the sense that the Certification Authority (CA) who accepted or set up the identifier or key and who vouch for the validity of that identifier to a third party have no way of knowing whether or when an identifier or key has been compromised. The onus is all on the key holder to keep track of the identifier and alert the CA as soon as a compromise is discovered; at which point the identifier is immediately revoked and a new identifier issued.

Credit cards and the like are subject to the same control and weaknesses. The problem is exacerbated with credit cards because their use has never been conducted particularly securely and many entities tend to have copies of a person's credit card data. In addition, there are many circumstances in which all a potential fraudster may require to purchase goods and services is the card holder's name, and the card number. As the cardholder still has the credit card in their possession, they may be completely unaware that the card data is being abused until a statement is issued (perhaps several weeks later) on which one or more unexplained charges appear.

The method according to an exemplary embodiment of the third aspect of the present invention achieves a much greater level of security and enables the identity of communicating parties to be established and/or confirmed (or denied) reliably in real time. This is achieved by the combination of two protocols, which will herein after be referred to as 'Strong Authentication' and 'Strong Revocation'.

The terms "authentication" and "strong authentication" are well known in many different fields and situations. Indeed, traditionally there have always been at least three ways to "authenticate" people. The first way is to identify who they are, i.e. by verifying some unique biometric feature, we recognise a person. This is, in fact, a relatively secure method of authentication during ordinary day-to-day life. However, when parties are communicating via an information technology network, such as the Internet, they may be communicating with parties they do not know and could not recognise in this manner even if they had the opportunity to do so, and, in any event, it has (to date) been technically difficult to allow the parties to see or hear the party with whom they are communicating sufficiently well to allow such simple and effective biometrics to be used.

Thus, if biometrics are to be used for authentication of parties communicating via an information technology communications network (or indeed in any situation involving communication between strangers), it must be on the basis of submission of the necessary biometric data to some form of non-human or automated check, which all interested parties agree to trust. This poses a much greater problem than it may appear at first glance. If such automated authentication is remote, the following questions arise:

can we be certain that the biometric data actually originates from the party it belongs to (or could it have been captured electronically from an earlier session, for example, and fed into the system)?

can we be certain that the person to whom the biometric data belongs is conscious or even alive? Fingerprints, for example, work just as well if taken from an unconscious or dead person. Even system which actually check for a "live" finger have been known to be compromised.

can we be certain that the person to whom the biometric data belongs is not being forced to provide the data against their will?

what are the risks of false positive and false negative identification? These issues are a particular problem with biometrics as it is often difficult to obtain a consistent biometric reading. Human beings have an innate ability to recognise, for example, faces under a huge number of visibility conditions and from almost any angle and, although automated systems have been developed which can emulate this ability to a certain degree, they are by no means as powerful as the human recognition ability.

It will be appreciated that many of the above problems are primarily associated with the issue of remote authentication.

A second way to authenticate a person is by what they have in their possession. For example, a known method of remote authentication is achieved by means of a smart card, which cannot allegedly be forged or otherwise compromised. However, as in the case of recognition using biometric data, a number of questions still arise:

can we be sure that the smart card signals or responses are coming from the card itself, and not a forged copy?

can we be sure that the smart card is, in fact in the possession of the correct person?

can we be sure that the card holder is not being forced to use the card under duress?

false positives and false negatives are less of a problem with such a digital system than with a system employing biometric data, because there is no need for interpretation with digital data: the response is either correct or incorrect. Nevertheless, although false positives should be very rare, false negatives can arise from damage to or malfunction of the card and, if this occurs at the wrong time, the results can be disastrous.

A third way to identify a person is by what they know. Personal Identification Numbers (PIN's) and passwords are a familiar example of information a person may be required to provide in order to authenticate their alleged identity. PIN's tend to be limited to 4 numbers, which allows only 10,000 possible combinations, so that the task of identifying the correct PIN number is a trivial computing matter, especially in the case of a system which permits unlimited attempts. Passwords, as such, are not necessarily insecure. However, a problem arises because many people have difficulty in remembering long, complicated passwords, and tend instead to select children's names, phone numbers, vehicle registration numbers, and other names and numbers which are easily guessed.

Thus, none of the above-described methods provide a foolproof way to authenticate a remote party. The term 'Strong Authentication' is applied to methods which employ two or more of the above methods simultaneously. For example, such a method may require the provision of a smart card and a password (and perhaps even a session PIN), using the logic that a stolen card cannot be used by anyone who does not know the password/PIN, and vice versa.

Another example of strong Authentication is the PKI protocol described above. This infrastructure is in common use and is widely trusted. It works on the basis that only the legitimate owner of a Private Key is supposed to have access to it for the purpose of sending messages or signing them. As with the proof of receipt protocol described above in the context of the present invention, the purpose of PK encryption is not so much to maintain secrecy, although this is considered to be a useful additional benefit. Instead, the main point behind the use of PK encryption is that the holder of the private key has a vested interest in safeguarding their key and ensuring that only they can access the key. There is also a well-established infrastructure for managing the keys and certificates (as described above) which maintain Trust in the PK system. However, there is one perceived weakness in the conventional PK system, which is the ability to repudiate transactions at a later date by claiming that the private key must have been compromised.

If, therefore, it were possible to show that the communications could only have been effected between the holders of relevant private keys, then we can legitimately assume that the holders of those private keys are indeed parties to the (disputed) transaction; with one proviso: that a compromised key is identified and revoked as soon as possible. This is the basis of the above-mentioned weakness of the PK system, in the sense that the compromise may not be detected for a considerable period of time, during which the private key may be used illegitimately, and following the discovery of such compromise, the legitimate owner of the key may (if they wish) revoke their key and repudiate any number of past transactions claiming that their key was compromised many months previously.

Briefly, the proposed Strong Revocation Protocol requires participants using any Private Secret Identifiers (smart cards, PK, credit cards etc) for any purpose to verify the immediately prior use of that Identifier (in the relevant domain, which may be global). The protocol can take two forms; with or without a trusted third party. Without a trusted third party, the protocol would require verification of the immediately prior transaction between the two parties only. Failure may only be implications for transactions between those two parties (although either party may, of course, choose to inform the relevant Certification Authority). With a trusted third party the protocol would require verification of the immediately prior transaction logged by the third party and that third party would confirm to each communicating party that their respective credentials had not been revoked. Such a third party is likely to be a CA itself and is thus likely to revoke any failed credentials, globally, immediately upon failure.

Explicit acceptance of previous transactions builds trust in the audit trail associated with that key. Should a dispute arise, say 30 transactions later than the disputed transaction, the card or key holder, if they wished to repudiate the disputed communication, would also have to repudiate the 30 subsequent communications which have been explicitly confirmed up until that point in time. The strength or weakness of any such repudiation would then come down to the number and nature of the subsequent transactions.

From this, it can be seen that the only way to repudiate a transaction prior to the last transaction is to repudiate all transactions back to the disputed transaction. This will, of course, be justified in some cases, where a card or key has been systematically abused for a period of time before the compromise comes to light. However, it would substantially reduce or eliminate the occurrence of illicit repudiation of older transactions.

Thus, going back to the exemplary method of the second aspect of the present invention (described above with reference to FIGS. 4A-4E of the drawings), the third party from whom key 2 is requested by the recipient of a message (at step 430 in FIG. 4C) maintains a record of each time key 2 is requested and by whom. In the Strong Revocation Protocol according to an exemplary embodiment of the third aspect of the present invention, the third party, in response to receipt of a request for key 2, identifies the requestor's public key (at step 430), using the record of public keys it maintains. Once the identity of the requestor is determined, the third party identifies (at step 430) the last transaction in which the identified requestor public key was involved and transmits a message (at step 440) to the requestor asking that person to confirm or deny the identified last transaction using key 2 in which they were involved. Thus, a message along the lines of "You last used this key at 4.24 pm on Tuesday 3 May 2002. The hash of the relevant encrypted e-mail is attached. Do you wish to check and confirm that prior use?"

Saying "No" immediately repudiates the previous transaction (and possibly a number before that) and immediately revokes the requestor's public key (step 480) at least with respect to its acceptance by the third party. If the requester responds positively, the third party may check the hash of the previous message against the requestor's own stored records (at step 510). If they match, the current transaction is allowed to proceed and key 2 is transmitted to the requestor (at step 515). If however, no match is identified, the requestor is informed and/or the third party may automatically terminate the current transaction, repudiate the previous transaction (and possibly a number before that) and immediately revoke the requestor's public key (step 480).

Thus with this (and the credit card scenario and the like), if anyone wants to repudiate a transaction many weeks old, they can only do so by repudiating all transactions since (which, after all, began by accepting the previous transactions). To an organisation which routinely sends out hundreds of e-mails per day or per week, for example, the above-described method provides considerable additional trust to all transactions.

Thus, a third party employing a combination of the first, second and third aspects of the present invention results in a system which provides:

a constant on-line source to for key 2;

a point at which the or each transaction can be publicly logged;

a point at which a previous transaction can be explicitly confirmed for the purpose of Strong Revocation; and the final level of validation of any audit trail through its printed MDH's.

An exemplary method combining the first, second and third aspects of the present invention, in order to ensure unequivocal evidence of the transmission and receipt of an electronic mail document is illustrated by the flow diagrams of FIGS. 4A to 4E. The bulleted numbers below match the Step numbers in the flow diagram.

The Sender

010 Creates original e-mail. Its hash value is calculated ($E_{hash}$)

020 Encrypts $E_{hash}$ with Sender's Private Key to create digital signature ($E_{sign}$)

030 Creates Secret Key (Key 1)

040 Saves copy of Key to Secure Audit Location this is the audit location referred to at (nnn). All items saved to this location are itemised into a Master Document Table (MDT) at the end of each Audit Period (typically daily). Content of MDT includes the following details of each file in the audit location:

File hash

File name

File time-stamp

File location (to indicate source by reference to tree structure. If tree structure not used, then file naming convention will hve to indicate source)

File size

Optional fields relating to internal references, topic, category etc (for integration into file management systems)

The hash of the MDT is sent to the third party as soon as each MDT is completed

The contents of the Audit Location are Securely Digitally Archived elsewhere and the Audit Location is wiped clean in preparation for the next Audit Period Encrypts email with Key 1; ($E_{k1}$)
   Using standard symmetric algorithms (e.g. Blowfish, Triple DES etc)
060 Calculates hash value of $E_{k1}$ ($E_{kw\text{-}hash}$)
   for comparison at step 170 with incoming response from Recipient at step 140
070 Sends $E_{k1}$ and $E_{sign}$ to Recipient
080 Saves copy of email to Secure Audit Location (see details under 040 above)
The Recipient
090 Receives $E_{k1}$ and $E_{sign}$
095 Saves copy to Secure Audit Location (see details under 040 above)
100 Calculates hash value of $E_{k1}$ ($E_{k1\text{-}hash}$)
110 Encrypts $E_{k1\text{-}hash}$ with Recipient's Private Key ($E_{k1\text{-}hash\text{-}RKpr}$)
   proves digital identity of Recipient when decrypted at step 160
120 Encrypts $E_{k1\text{-}hash\text{-}RKpr}$ with Sender's Public Key ($E_{k1\text{-}hash\text{-}RKpr\text{-}skpu}$)
   only sender can decrypt
130 Returns $E_{k1\text{-}hash\text{-}RKpr\text{-}skpu}$ to Sender
135 Saves copy to Secure Audit Location (see details under 040 above)
The Sender
140 Receives $E_{k1\text{-}hash\text{-}RKpr\text{-}skpu}$
145 Saves copy to Secure Audit Location (see details under 040 above)
150 Decrypts $E_{k1\text{-}hash\text{-}RKpr\text{-}skpu}$ with Sender's Private Key to retrieve $E_{k1\text{-}hash\text{-}RKpr\text{-}skpr}$
160 Decrypts $E_{k1\text{-}hash\text{-}RKpr\text{-}skpr}$ with Recipient's Public Key to extract $E_{k1\text{-}hash}$
170 Confirms result matches own copy $E_{k1\text{-}hash}$
   proves digital identity of Recipient
   proves Recipient has received encrypted email
180 Creates Key 2
   only security requirement for Key 2 is that Recipient must not be ble to obtain it other than by going through the logged transactions involving the third party
185 Saves copy of Key to Secure Audit Location (see details under 040 above)
   possibly delayed until protocol completed if significant risk of premature leakage to Recipient
190 Encrypts Key 1 with Key 2 ($K1_{k2}$)
200 Calculates Hash value of $K1_{k2}$ ($K1_{k2\text{-}hash}$)
   to be used as identifying token with third party
210 Encrypts $K1_{k2}$ with Recipients Public Key ($K1_{k2\text{-}RKpu}$)
   only Recipients can decrypt
220 Sends $K1_{k2\text{-}RKpu}$ to Recipient
225 Saves copy to Secure Audit Location (see details under 040 above)

Now that both parties have proved their digital identities, private key signing is optional. There is no content security issue as both the message and its main key have now been securely transmitted. The remainder of the protocol is designed to enable third party logging and audit trail of the transaction involved the second key.
The Sender
230 Encrypts Key 2 with third party Public Key ($K2_{3Kpu}$)
   to prevent premature leak to Recipient
240 Encrypts $K1_{k2\text{-}hash}$ with third party Public Key ($K1_{k2\text{-}hash\text{-}3Kpu}$)
   to prevent anyone other than parties to the email obtaining the "recognition" token
250 Digitally signs both and sends to third party
255 Saves copy to Secure Audit Location (see details under 040 above)

The Third Party
260 Receives $K2_{JKpu}$ and $K1_{k2\text{-}hash\text{-}3Kpu}$ digitally signed by Sender
270 Retrieves Public Key for sender and "Previous Transaction" Token (PTT)
   (eg previous $K1_{k2\text{-}hash\text{-}3Kpu}$ sent by Sender)
280 Returns PTT to sender and requests confirmation that Sender agrees it was the previous transaction
   Sender accepts its validity
The Sender
290 Receives PTT and request for validation
300 Sender's Software retrieves details of transaction represented by the PTT and presents it to the Sender (or reports No Match Found)
310 Sender either accepts or rejects previous transaction
   To ensure fully conscious participation by the user, the Software generates two unique four digit codes which must be entered to accept or reject the PTT. If Rejection is selected, full screen warnings remind the user of the consequences (Key Revocation)
   Entry of either is further confirmed by typing the word "YES" in full.
   New transaction only proceeds if previous transaction accepted.
   Rejects if No Match Found or wishes to Repudiate for other reasons.
The Third Party
320 Receives confirmation of previous transaction
   or rejects new transaction and revokes Sender's Public Key
     if third party is the Certification Authority (CA) for the Key, revocation is Global
     otherwise the revocation is only in respect of transactions with the third party
       although the third party may take it upon itself to inform the CA who may, in turn, revoke the Key globally
330 Accepts the new transaction. Time-stamps the incoming tokens-$K2_{3Kpu}$ and $K1_{k2\text{-}hash\text{-}3Kpu}$
340 Decrypts $K2_{3Kpu}$ to retrieve K2
   Minimal risk in holding plaintext Key 2
   If risk assessed as significant, decryption can be delayed until after step 420
   Saves time so that later transaction with Recipient can be fast enough to conduct online
350 Confirms receipt to the Sender
The Recipient
360 Receives $K1_{k2\text{-}RKpu}$ from the Sender
365 Saves copy to Secure Audit Location (see details under 040 above)
370 Decrypts $K1_{k2\text{-}RKpu}$ with Recipient's Private Key to retieve $K1_{k2}$
380 Hashes the result to create $K1_{k2\text{-}hash}$
390 Encrypts $K1_{k2\text{-}hash}$ with third party Public Key ($K1_{k2\text{-}hash\text{-}3Kpu}$)
   content security not required but this token will match the one sent by the Sender without requiring third party to waste time decrypting
400 Softwre Initiates secure online connection to third party
   Secure Connection using 128 bit SSL or better
   The next steps (up to step 540) can only take place during this online session
Digitally signs and sends $K1_{k2\text{-}harh\text{-}3Kpu\text{-}sign}$ to third party
415 Creates one time key (Key 3) and sends to third party as one time pad for Key 2
   same length as Key 2
   held in RAM only, if session ends prematurely, Key 2 cannot be retrieved, transaction has to be repeated.

The Third Party
420 Receives K1$_{k2\text{-}hash\text{-}3Kpu\text{-}sign}$ together with Key 3
430 Retrieves Public Key for Recipient and Previous Transaction Token (PTT) sent by Recipient
440 Returns PTT to Recipient and requests confirmation that Recipient agrees it was the previous transaction
Recipient accepts its validity
The Recipient Software
450 Receives PTT and request for validation
460 Recipient's Software retrieves details of transaction represented by the PTT and presents it to the Recipient (or reports No Match Found)
470 Recipient either accepts or rejects previous transaction
  To ensure fully conscious participation by the user, the Software generates two unique four digit codes which must be entered to accept or reject the PTT. If Rejection is selected, fall screen warnings remind the user of the consequences (Key Revocation)
  Entry of either is further confirmed by typing the word "YES" in full.
  New transaction only proceeds if previous transaction accepted.
  Rejects if No Match Found or wishes to Repudiate for other reasons.
The Third Party
480 Receives confirmation of previous transaction
  Or rejects new transaction and revokes Recipient's Public Key
    If third party is the Certification Authority (CA) for the Key, revocation is Global
    Otherwise the revocation is only in respect of transactions with the third party
      But the third party may take it upon itself to inform the CA who may, in turn, revoke the Key globally
490 Accepts the new transaction. Time stamps the incoming token K1$_{k2\text{-}hash\text{-}3Kpu}$
500 Confirms acceptance to the Recipient
510 Recognises token received at step 420 Matches token received from Sender at step 260 and encrypts matching Key 2 with Key 3 (K2$_{k3}$)
515 Send K2$_{k3}$ to Recipient while Recipient still connected
  Encryption and transfer 32 bytes virtually instantaneous.
The Recipient Software
520 Receives K2$_{k3}$
525 Saves copy to Secure Audit Location (see details under 040 above)
530 Sends receipt for K2$_{k3}$ and awaits acknowledgement from third party
535 only after receiving final acknowledgement from third party, decrypts K2$_{k3}$ with Key 3.
  Key 3 is then erased
  Key 3 only exists in the Recipient's workstation memory (and nowhere else) for a few seconds. It is used to ensure that Key 2 is properly receipted to the third party. If that doesn't happen, for example because the recipient either deliberately or accidentally crashes the software or switches off the machine, Key 3 disappears and K2$_{k3}$ cannot be decrypted to retrieve Key 2. Without K2, Key 1 and the original message cannot be read
  The software will only attempt to decrypt K2$_{k3}$ once the receipt has been sent (and acknowledged by third party).
540 terminates the secure connection to the third party once K2 is successfully retrieved
  if it fails for any reason, a new Key 3 is created and steps 510 onward are repeated Third Party
550 confirms to the Sender that Recipient now holds Key 2
560 Burns its time-stamped records of the transactions on to a Write Once CD ROM
570 Stores relevant details in its audit trail and Master Document Table
580 Eventually publishes the Master Document Hash which corroborates the transactions
Recipient
590 decrypts Key 1 with Key 2
600 Decrypts E$_{k1}$ with Key 1 to retrieve original email
605 saves copy to Secure Audit Location (see details under 040 above)
610 Calculates Hash and
620 compares result to decrypted E$_{sign}$ received at step 090
630 is required to report failure to Sender immediately if match fails
  within agreed time limit (which defaults to 24 hours)
  Saves copy to Secure Audit Location (see details under 040 above)
  Software gathers all relevant transactions into zipped archive for transmission back to sender for diagnosis.
The importance of the Software in the operation of this protocol cannot be overstated.
It ensures that all steps are complete in the correct order
It controls and enforces Strong Authentication (including digital signing)
It forces the human user to make conscious choices when required for Strong Revocation
It sends mandatory acknowledgements and receipts regardless of human intervention and
Will not permit subsequent steps to proceed without previous steps having been properly completed
Makes the final retrieval of Key 2 impossible unless all preceding steps have been correctly completed.
Assuming that the software and protocols are implemented as described in the above exemplary embodiment, it can be seen that:
The salient details of an e-mail can be captured to an audit trail;
The audit trail cannot be falsified without detection;
The audit trail alone is sufficient to validate creation and content of a document;
The message cannot be opened by anyone who does not have access to the intended recipient's private key;
The message cannot be opened without two keys created by the sender;
The request for the first key, submitted in the required form to the sender, constitutes proof of receipt of the encrypted e-mail;
The key cannot be opened by anyone who does not have access to the intended recipient's private key;
The key cannot be opened without a second key held by a Trusted Third Party;
The request for the second key, submitted in the proper form, constitutes proof of receipt of the first key;
The role of the Trusted Third Party is to provide:
  a constant on-line source to for key 2;
  a point at which the or each transaction can be publicly logged;
  a point at which a previous transaction can be explicitly confirmed for the purpose of Strong Revocation; and
  the final level of validation of any audit trail through its printed MDH's.
The software will continue requesting the second key until it receives one;

The software prevents retrieval of Key 2 (and thus retrieval of Key 1 and the original email) unless the software recognises proper receipting and acknowledgement has taken place between the Recipient and third party.

The software will log and report a failure should the eventual decrypted message fail to match its original hash;

The protocol requirement for any problems to be reported at the earliest opportunity imposes an obligation on the recipient which makes late repudiation even more difficult to sustain.

Thus the specific functionality of the arrangement described above is achieved by exchanging messages, keys and hashes in a relatively complex series of transactions, the final portions of which are mediated by an automated third party which securely logs its transactions and stores them in a protected audit trail as described above. Human interaction is limited in most cases to the selection of simple menu choices provided in conventional email client packages. The exception to this simplicity is the conscious participation required for strong revocation. Although simple (entry of a four digit code and typing "YES") it is deliberately designed to ensure that it cannot be carried out automatically or without thought.

The above-described functionality is intended to provide a "certainty without intrusion", in the sense that any third party intervention is minimal and may be based around the provision of a single identifier, such as an encryption key which reveals nothing about the data being generated and communicated. The third party role is vital, however, in that it proves, with time-stamped copies of the relevant keys and its protected audit trail, that the exchange of Key 2 took place. As the logic above illustrates, Key 2 can only be exchanged as a result of a series of steps which must have included the transmission and receipt of both the original email and its secret key.

The specific description given above refers primarily to transactions involving e-mail documents. For the purpose of this specification, the term 'e-mail document' is defined as any document (together with any attachments) which are transmitted across an information technology communications network (such as the Internet) using, for example, a standard e-mail address (such as one exemplified by NameOfRecipient@ispdomain.com). However, the invention is not intended to be limited to transactions involving e-mails, and may be employed with respect to any type of remote transaction performed across an information technology communications network.

The invention claimed is:

1. A computer-implemented method of authenticating data and providing a dated audit trail, said method comprising: (a) storing copies of a plurality of data items at a first location; (b) generating a first data file at the end of a predetermined dated audit period, the first data file comprising a respective hash value of each said plurality of stored data items; (c) generating a single hash value of said first data file, the single hash value corresponding to said predetermined dated audit period; (d) transmitting said single hash value to a second location remote from said first location, via an information technology communications network; (e) creating at said remote location a second data file for said predetermined dated audit period, said second data file comprising said single hash value and one or more additional data items relating to said single hash value; (f) generating a hash value for said second data file, said hash value for said second data file corresponding to said predetermined dated audit period; (g) publishing said hash value for said second data file in a dated journal of record published in numerous copies and held in separate public libraries, wherein the published hash value for said second data file corresponds to said predetermined dated audit period; (h) at a date subsequent to the publishing of (g), generating a hash value for said second data file; and (i) comparing the hash value for the second data file generated in (h) with the hash value for said second data file published in said dated journal, whereby if the hash value generated in step (h) is identical to the hash value published in said dated journal said second data file is authenticated.

2. A computer-implemented method according to claim 1, wherein: said first data file contains at least one identifier selected from the group consisting of a file name, a path name, a file size and a time stamp.

3. A computer-implemented method according to claim 1, wherein: least one of said first data items comprises a message to be transmitted from a sender to a receiver.

4. A computer-implemented method according to claim 3, further comprising: the sender generating a first hash value of said message; the sender encrypting said message with a first secret key and producing a second hash value from said encrypted message; the sender encrypting said first secret key with a second secret key; the sender transmitting to the receiver said encrypted message, said encrypted first secret key and said first hash value; the sender transmitting said second hash value and said second secret key to a third party; the third party storing the transmitted second hash value and second secret key for audit purposes; the receiver receiving said encrypted message and generating a purported copy of said second hash value of said encrypted message; the receiver transmitting the purported copy of said second hash value to the third party; the third party determining whether the purported copy matches said second hash value; and the third party then releasing said second key if a match is so determined.

5. A computer-implemented method according to claim 4, wherein: the first secret key is symmetric and the second secret key is asymmetric.

6. A computer-implemented method according to claim 1, wherein: said first location is a predetermined audit location that stores data items supplied thereto over the predetermined dated audit period, and the first data file generated in (a) comprises respective hash values of the data items stored in said predetermined audit location at the end of the predetermined dated audit period.

* * * * *